(12) United States Patent
Tewani et al.

(10) Patent No.: US 7,929,440 B2
(45) Date of Patent: Apr. 19, 2011

(54) SYSTEMS AND METHODS FOR CAPACITY PLANNING USING CLASSIFIED TRAFFIC

(75) Inventors: Kamlesh Tewani, Freehold, NJ (US); Mohan Gawande, Cranbury, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 170 days.

(21) Appl. No.: 12/389,545

(22) Filed: Feb. 20, 2009

(65) Prior Publication Data

US 2010/0214920 A1     Aug. 26, 2010

(51) Int. Cl.
    *G01R 31/08* (2006.01)
(52) U.S. Cl. ......... 370/232; 370/237; 370/238; 370/400
(58) Field of Classification Search .................. 370/232, 370/237–238, 235, 229, 356, 400, 395.65, 370/395.21
See application file for complete search history.

(56) References Cited

U.S. PATENT DOCUMENTS

| | | | |
|---|---|---|---|
| 5,381,404 A | 1/1995 | Sugano et al. ................. 370/238 |
| 6,011,780 A | 1/2000 | Vaman et al. ................. 370/237 |
| 6,262,976 B1 | 7/2001 | McNamara | |
| 6,404,735 B1 | 6/2002 | Beshai et al. | |
| 6,480,495 B1 | 11/2002 | Mauger et al. ........... 370/395.65 |
| 6,493,317 B1 | 12/2002 | Ma | |
| 6,625,650 B2 | 9/2003 | Stelliga | |
| 6,785,260 B1 | 8/2004 | Goyal et al. | |
| 6,819,746 B1 | 11/2004 | Schneider et al. ......... 379/29.01 |
| 6,958,974 B1 | 10/2005 | Prehofer ....................... 370/235 |
| 7,054,308 B1 | 5/2006 | Conway ........................ 370/356 |
| 7,249,169 B2 | 7/2007 | Blouin et al. | |
| 7,468,975 B1 | 12/2008 | Davis | |
| 2002/0059432 A1 | 5/2002 | Masuda et al. ................ 709/227 |
| 2002/0163884 A1 | 11/2002 | Peles et al. .................... 370/229 |
| 2003/0035429 A1 | 2/2003 | Mitra et al. .................... 370/400 |

*Primary Examiner* — Aung S Moe
*Assistant Examiner* — Vinncelas Louis
(74) *Attorney, Agent, or Firm* — Larson Newman & Abel, LLP

(57) ABSTRACT

A method of capacity planning in a network includes assigning a class of service to each packet of data on the network. Each class of service is also assigned a grade of service for different network conditions. A class bandwidth is calculated for each class of service under each network condition by multiplying an expected load for each class of service by the associated grade of service under each of the network conditions. A network condition bandwidth is calculated for each network condition by adding together the class bandwidths for all classes. A network capacity is predicted based upon the largest network condition bandwidth. A network management apparatus can perform the method.

16 Claims, 11 Drawing Sheets

SYSTEMS AND METHODS FOR CAPACITY PLANNING USING CLASSIFIED TRAFFIC

FIELD OF THE DISCLOSURE

The present disclosure generally relates to communications networks, and more particularly relates to capacity planning in communications networks.

BACKGROUND

The Internet has become a primary communication channel for the world, as it continues to grow in traffic volumes and reach. The types of applications supported over the Internet are also changing, from basic applications such as web browsing to applications with real-time constraints such as Internet Protocol (IP) telephony. As traffic volumes grow, network providers must not only maintain sufficient capacity for the existing traffic, but also must efficiently predict future capacity needs and plan for the growth of traffic volumes.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
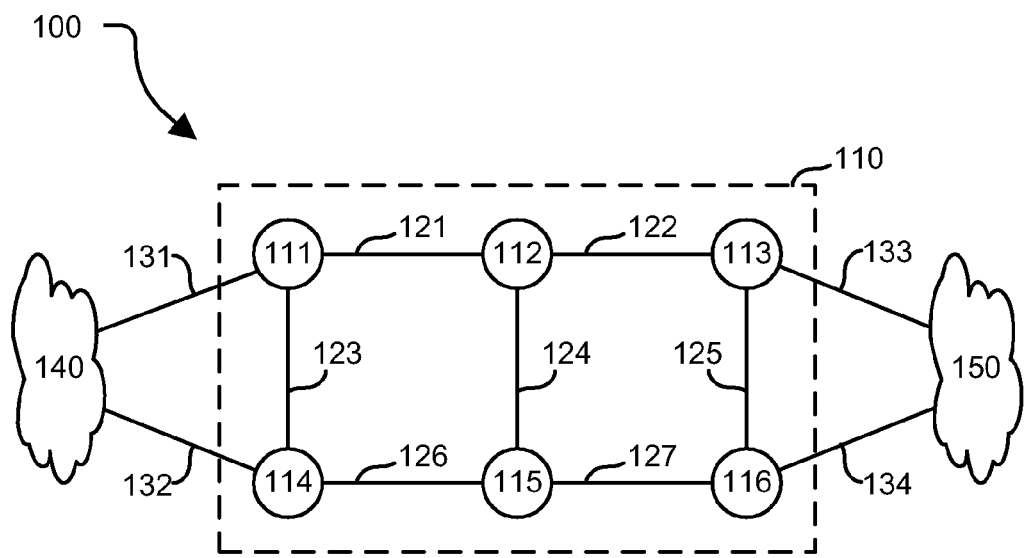
FIG. 1 is a block diagram illustrating an embodiment of a communications network.

FIG. 1 illustrates a communications network 100. Communications network 100 includes a network 110 that is coupled to two autonomous systems (ASs) 140 and 150. Communications network 100 can be the Internet, a proprietary communications network, another network, or any combination thereof. Network 110 includes a plurality of nodes 111 through 116. Pairs of nodes 111 through 116 are connected by links 121 through 127. For example, node 111 is connected to node 112 though link 121. ASs 140 and 150 are connected to network 110 by links 131 through 134. For example, AS 140 is connected to network 110 at node 111 through link 131, and at node 114 through link 132. Network 110 can be an autonomous system or a high capacity core network. As such, nodes 111 through 116 can be Internet border or core routers, edge routers, other nodes, or any combination thereof. Further, links 121 through 134 can be logical links carried in the physical layer by fiber optic links, coaxial cable links, copper twisted-pair links, wireless links, other technology links, or any combination thereof.

Each link 121 through 134 has a link capacity that limits the amount of traffic that can travel through link 121 through 134. In an exemplary embodiment, links 121 through 134 are high capacity fiber optic connections with a link capacity of 10 gigabit per second (Gb/s). Alternatively, links 121 through 134 have link capacities that are higher or lower than 10 Gb/s. When the amount of traffic exceeds the link capacity, the links 121 through 134 can become saturated. During limited periods of saturation, traffic can be queued at nodes 111 through 116. However, the queuing capacity of nodes 111 through 116 can be limited, resulting in loss of data packets during extended periods of link saturation.

Figure 2:
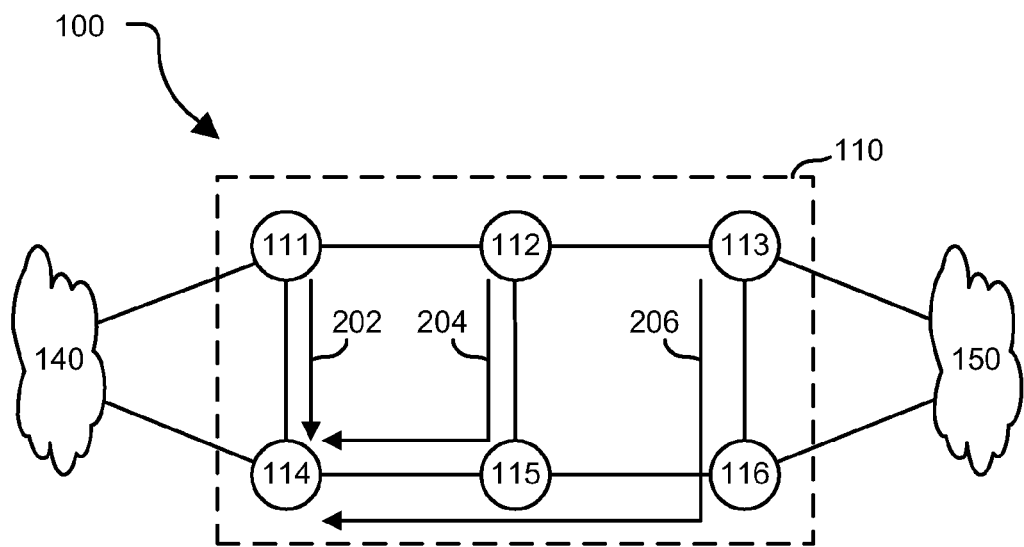
FIG. 2 is a block diagram illustrating data transmission in the communications network of FIG. 1.

FIG. 2 illustrates data transmission through communications network 100. Data transmission through communications network 100 consists of data traffic flows between pairs of nodes 111 through 116. For example, flow 202 illustrates data transmission between nodes 111 and 114, where data enters node 111, passes over link 123, and exits node 114. Flow 204 illustrates data transmission between nodes 112 and 114, where data enters node 112, passes over link 124 to node 115, passes over link 126, and exits node 114. Flow 206 illustrates data transmission between nodes 113 and 114, where data enters node 113, passes over link 125 to node 116, passes over link 127 to node 115, passes over link 126, and exits node 114. Flows 204 and 206 pass over link 126. The combined network utilization of data traffic flows passing over any given link 121 through 127 should not exceed the link capacity for that link. For example, the combined data transmission of flows 204, and 206 should not exceed the link capacity of link 126. If the combined utilization of flows 204, and 206 exceeds the link capacity of link 126, there is a chance for data to be lost. For example, data packets can be dropped, resulting in a corresponding reduction in the efficiency of the communications network 100. Thus the provider of network 110 should ensure that the link capacity of each link 121 through 127 is sufficient to handle the expected amount of data that network 110 is expected to handle.

A network can experience problems which change the normal routing and flow of data. For example, a particular link between a pair of nodes may fail. In this case, data transmission between the pair of nodes is impacted, and the network must find another route for the data to pass from one node to the other. In another example, a node may fail. Here, all data transmission to and from the failed node ceases. This presents a more difficult challenge in finding alternative routes for the data, because a failed node has the same effect as if all links to the node had failed.

Figure 3:
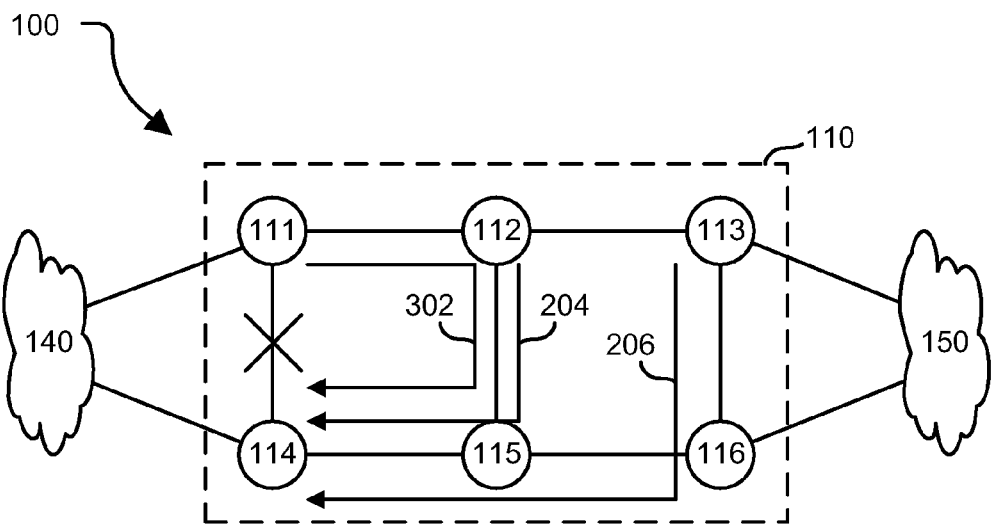
FIG. 3 is a block diagram illustrating data transmission in the communications network of FIG. 1 with a link failure.

FIG. 3 illustrates data transmission through communications network 100 when there is a link failure. Here link 123 is shown as the failing link. In this case, flows 204 and 206 are unaffected by the link failure in link 123. However, flow 202 is prevented due to the link failure in link 123. Instead, the data transmission between nodes 111 and 114 must take a new route, illustrated by flow 302, where data enters node 111, passes over link 121 to node 112, passes over link 124 to node 115, passes over link 126, and exits node 114. Note that, with a failure of link 123, the data transmitted through link 124 increases, passing both flow 204 and flow 302, and the data transmitted through link 126 increases, passing flows 204, 206, and 302.

Figure 4:
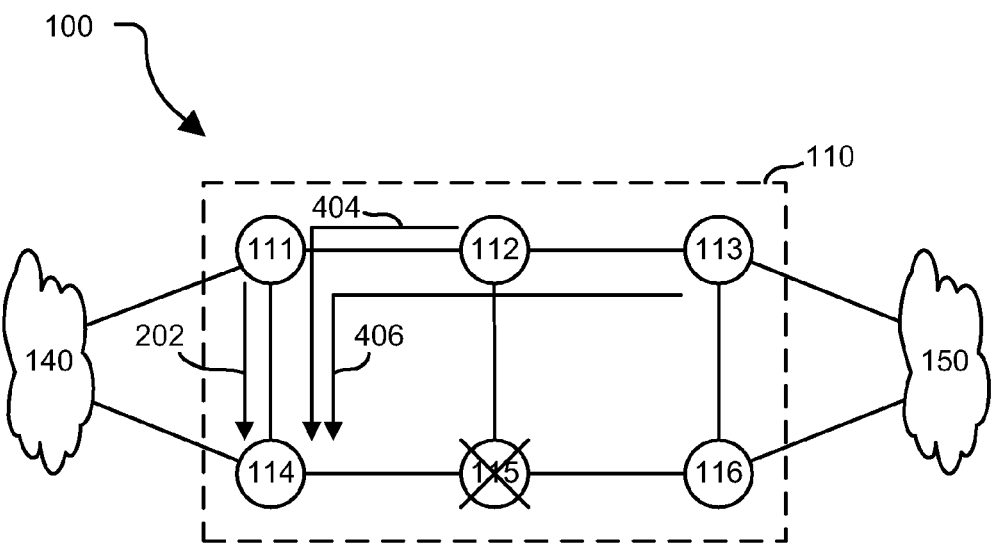
FIG. 4 is a block diagram illustrating data transmission in the communications network of FIG. 1 with a node failure.

FIG. 4 illustrates data transmission through communications network 100 when there is a node failure. Here node 115 is shown as the failing node. In this case, flow 202 is unaffected by the node failure in node 115. However, flows 204 and 206 are impacted due to the failure of node 115. Instead, the data transmission between nodes 112 and 114, and between nodes 113 and 114 must take new routes, illustrated by flows 404 and 406, respectively. In flow 404, data enters node 112, passes over link 121 to node 111, passes over link 123, and exits node 114. In flow 406, data enters node 113, passes over link 122 to node 112, passes over link 121 to node 111, passes over link 123, and exits node 114. Note that with a failure of node 115, the data transmitted through link 123 increases, passing flows 202, 404, and 406.

A network provider can plan for problems that change the normal routing and flow of data over a particular link by modeling worst-case data traffic on that link under different failing conditions. Data traffic in a link can be segregated into classes. In one embodiment, data traffic is segregated into three classes. For example, class 1 data traffic can include network control information, which is generally of low volume, real time information such as streaming media data, or other high priority data traffic where loss of data is not acceptable, and timely delivery is critical. Class 2 data traffic can include a higher volume of business critical information, web page data or other medium priority data traffic where loss of data is highly undesirable, but acceptable under some failure conditions. The quality of service for such classes may be governed by service level agreements with a penalty for certain losses. Class 3 data traffic can include "best effort" traffic, such as e-mail where delivery times are not a critical. In another embodiment, data traffic is segregated into more than three classes.

Traffic volumes between two nodes or on a link can vary widely over time, resulting in a peak volume that can be substantially higher than the average. A network provider can also decide to grade their service, such that under different network conditions, the network provider will commit to carry a predetermined percentage of the total traffic. For example, a network provider can decide to guarantee that 99% of the peak network traffic will be delivered under a normal operating condition, but only 80% of the peak network traffic under a link or a node failure. After modeling the worst-case data traffic on a link under different failing conditions, the network provider can determine a link capacity for that link, and provide sufficient hardware on that link to ensure that the link can handle the worst-case load. In another embodiment, a network provider can plan for future growth on that link by determining a growth factor, and providing sufficient additional hardware on that link to account for the growth factor.

Table 1 illustrates an exemplary model of worst-case data traffic on a link. Data traffic of classes 1, 2, and 3 over the link are modeled under normal conditions, under a link failure condition in another link within the network, and under a node failure condition in another node within the network. Traffic flows shown are measured in Gb/s, but a different data volume per unit of time could be chosen depending upon the capacity of the particular link. For example, the traffic flows can be measured in megabits per second (Mb/s), Gb/s, in Terabits per second (Tb/s), or another appropriate measure for the particular link.

TABLE 1

| | Class 1 | Class 2 | Class 3 | Total | Grade | Total Bandwidth |
|---|---|---|---|---|---|---|
| Normal | 2 | 20 | 100 | 122 | 1.00 | 122.00 |
| Link Failure | 4 | 40 | 200 | 244 | 0.80 | 195.20 |
| Node Failure | 6 | 60 | 300 | 366 | 0.70 | 256.20 |
| Worst-case Load | | | | | | 256.20 |
| Minimum Link (=125% of Worst Load) | | | | | | 320.25 |

Here the grade of normal service is 100%, the grade of service under a link failure condition is 80%, and the grade of service under a node failure condition is 70%. Under normal conditions, the link demand is 2 Gb/s of class 1 data traffic, 20 Gb/s of class 2 data traffic, and 100 Gb/s of class 3 data traffic, or a total of 122 Gb/s of data traffic. Given the 100% service grade, the total bandwidth required to carry normal traffic is 122 Gb/s. Under a link failure, the link demand is 4 Gb/s of class 1 data traffic, 40 Gb/s of class 2 data traffic, and 200 Gb/s of class 3 data traffic, or a total of 244 Gb/s of data traffic. Given the 80% service grade, the total bandwidth required to carry the service degraded link demand under link failure conditions is 195.20 Gb/s. Under a node failure, the link demand is 6 Gb/s of class 1 data traffic, 60 Gb/s of class 2 data traffic, and 300 Gb/s of class 3 data traffic, or a total of 366 Gb/s of data traffic. Given the 70% service grade, the total bandwidth required to carry the service degraded link demand under node failure conditions is 256.20 Gb/s. Thus, the worst-case load occurs when there is a node failure, when the link can be projected to carry 256.20 Gb/s of data traffic, and the link should be designed to carry no less than 256.20 Gb/s of data traffic. Applying a 25% growth factor leads to a planned link capacity of 320.25 Gb/s. Note that similar modeling can be performed to consider network conditions with two or more link failures, two or more node failures, or a combination of link and node failures. Different grades of service and growth factors may also be applied to the various models.

In the above example, the service grade is applied uniformly to all classes of data traffic. In another embodiment, a network provider can plan for problems that change the normal routing and flow of data over a particular link by applying different grades of service for each traffic class. For example, it may be unacceptable to degrade the service of class 1 data traffic under any network condition, while the network provider may be willing to degrade class 3 data traffic further than either class 1 or class 2 data traffic. Table 2 illustrates an exemplary model of worst-case data traffic on a link using different grades of service for each traffic class. Data traffic of classes 1, 2, and 3 over the link are modeled under normal conditions, under a link failure condition in another link within the network, and under a node failure condition in another node within the network. Traffic flows shown are measured in Gb/s.

TABLE 2

| | Class 1 | Grade | Class B/W | Class 2 | Grade | Class B/W | Class 3 | Grade | Class B/W | Total |
|---|---|---|---|---|---|---|---|---|---|---|
| Normal | 2 | 1.00 | 2.00 | 20 | 1.00 | 20 | 100 | 1.00 | 100 | 122 |
| Link Failure | 4 | 1.00 | 4.00 | 40 | 0.80 | 32 | 200 | 0.50 | 100 | 136 |
| Node Failure | 6 | 1.00 | 6.00 | 60 | 0.80 | 48 | 300 | 0.50 | 150 | 204 |
| Worst-case Load | | | | | | | | | | 204 |
| Minimum Link (=125% of Worst Load) | | | | | | | | | | 255 |

Here the grade of class 1 data traffic is 100% in all circumstances, the grade of class 2 data traffic is 100% in normal conditions and is 80% under link failure and node failure conditions, and the grade of class 3 data traffic is 100% in normal conditions and is 50% under link failure and node failure conditions. Under normal conditions, the link demand is 2 Gb/s of class 1 data traffic, 20 Gb/s of class 2 data traffic, and 100 Gb/s of class 3 data traffic, or a total of 122 Gb/s of data traffic. Given the 100% service grade for each class under normal conditions, the total bandwidth required to carry normal traffic is 122 Gb/s.

Under a link failure, the link demand is 4 Gb/s of class 1 data traffic, 40 Gb/s of class 2 data traffic, and 200 Gb/s of class 3 data traffic, or a total of 244 Gb/s of data traffic. However, applying the service grades to each class of data traffic, the bandwidth demand is 4 Gb/s (e.g. 4 Gb/s×100%) of class 1 data traffic, 32 Gb/s (e.g. 40 Gb/s×80%) of class 2 data traffic, and 100 Gb/s (e.g. 200 Gb/s×50%) of class 3 data traffic. Given the class based service grades, the total bandwidth required to carry the service degraded link demand under link failure conditions is 136 Gb/s. Under a node failure, the link demand is 6 Gb/s of class 1 data traffic, 60 Gb/s of class 2 data traffic, and 300 Gb/s of class 3 data traffic, or a total of 366 Gb/s of data traffic. However, applying the service grades to each class of data traffic, the bandwidth demand is 6 Gb/s (e.g. 6 Gb/s×100%) of class 1 data traffic, 48 Gb/s (e.g. 60 Gb/s×80%) of class 2 data traffic, and 150 Gb/s (e.g. 300 Gb/s×50%) of class 3 data traffic. Given the class based service grades, the total bandwidth required to carry the service degraded link demand under node failure conditions is 204 Gb/s. Thus, the worst-case load occurs when there is a node failure, when the link can be projected to carry 204 Gb/s of data traffic. Applying a 25% growth factor leads to a planned link capacity of 255 Gb/s. Again, similar modeling can be performed to consider network conditions with two or more link failures, two or more node failures, or a combination of link and node failures, and different grades of service and growth factors may also be applied to the models.

Note that applying different grades of service for each traffic class permits the network provider to reduce the planned link capacity. As seen in the above examples, the planned link capacity was reduced from 366 Gb/s to 255 Gb/s. Information can be gathered from the network to create a model of network traffic under the different conditions. For example, real time or historical traffic flow information can be gathered from the network equipment through a network management data collection mechanism that may utilize for example Simple Network Management Protocol (SNMP), Remote Network Monitoring (RMON), another network management mechanism, or any combination thereof. Real time traffic flow information can be gathered periodically to obtain a view to traffic flow patterns over time. Periodic information can be gathered in set time intervals, such as minutes, days, months, or any other time interval. Historical traffic flow information can be based upon accumulated traffic flow information over similar time intervals. A non-limiting example of historic traffic flow information includes a peak traffic flow, a percentile traffic flow rate, another historical traffic flow measurement, or a combination thereof. Non-historical information may also be used to supplement historical traffic flow information. A non-limiting example of non-historical information includes marketing forecast or pre-planned traffic for new customer demand.

Traffic flow information can be gathered and models generated on a link-by-link basis where each link is individually modeled, or on a router pair basis. In this way, the worst-case load can be determined for each link or router pair. A link-based analysis is done when a failure condition may result in change in a link load, e.g., due to change in the routing of traffic that utilized the failed network element. A router-pair based analysis is appropriate when the traffic between two routers is affected by a failure of a network element. An example of this is traffic, from node 114, to a peering exchange node 116, to an external peer's network 150. The external peer's network is generally reachable by several peering exchange nodes. Under failure of the peering exchange node 116, or another network element, the traffic may be delivered to a different peering exchange node, e.g., 113 to network 150. Both link and router-pair based analyses may be used for capacity planning. When the modeled worst-case load for a particular link exceeds the current capacity of the link, the network operator can upgrade the equipment that makes up the link such that the upgraded capacity of the link equals or exceeds the modeled worst-case load. Upgrading typically occurs in discrete quantities, such as 120 Mb/s or 622 Mb/s, based upon commercially available equipment.

Applying different grades of service for each traffic class enables the network provider to more efficiently model their network resources, resulting in less frequent and less costly upgrades to the network capacity. However, in order to ensure the reliable delivery of network traffic, the network provider can change the routing behavior of the network to reflect the class and service grade based capacity model. As such, a network node can be made to track the class of traffic being routed through the node, and the current status of the network in the form of current service grades for each class, and then route the different classes of data based upon the current service grade for each class. In this way, the network provider can ensure more reliable delivery of class 1 data traffic, even while operating with failures in the network, and decrease the quantity of dropped traffic on the network. A network provider can choose an optimum routing mechanism for normal network operation. For example, in normal operation a network operator can choose a Routing Information Protocol (RIP), an Intermediate System to Intermediate System (IS-IS) protocol, an Open Shortest Path First (OSPF) protocol, another routing protocol, or any combination thereof. When a network failure occurs, the routing behavior can be changed to route certain classes of data traffic or portions thereof with the chosen optimum routing protocol, and other classes or portions of classes using a less optimal routing protocol.

Figure 5:
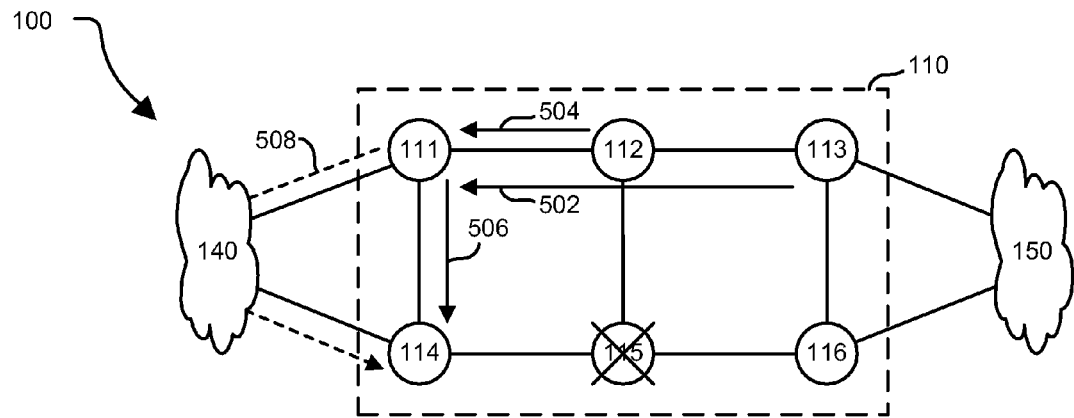
FIG. 5 is a flow diagram illustrating data transmission in the communications network of FIG. 1 with a node failure, and where a portion of the transmission is routed over different links.

FIG. 5 illustrates data transmission through communications network 100 when there is a node failure, and a portion of the classes 2 and 3 data traffic are routed over different links. Here node 115 is shown as the failing node. Flow 502 illustrates data transmission between nodes 113 and 111 that includes data traffic of classes 1, 2, and 3, and that is intended to be routed to node 114. Similarly, flow 504 illustrates data transmission between nodes 112 and 111 that includes data traffic of classes 1, 2, and 3, and that is intended to be routed to node 114. Node 111 receives the class 1, 2, and 3 data traffic from flows 502 and 504.

Using the example of table 2, when there is a node failure on network 110, the service grade for class 1 data traffic is 100%, for class 2 data traffic is 80%, and for class 3 data traffic is 50%. Therefore node 111 forwards 100% of the class 1 data from flows 502 and 504 to node 114, 80% of the class 2 data from flows 502 and 504, and 50% of the class 3 data from flows 502 and 504. This combined data traffic is shown in flow 506. Node 111 also forwards the remaining 20% of class 2 data from flows 502 and 504, and the remaining 50% of class 3 data from flows 502 and 504 to node 114 through AS 140, as illustrated by flow 508. While routing flow 508 out of network 110 and through AS 140 may be slower, the total data traffic from flows 502 and 504 are ultimately routed correctly to node 114.

Figure 6:
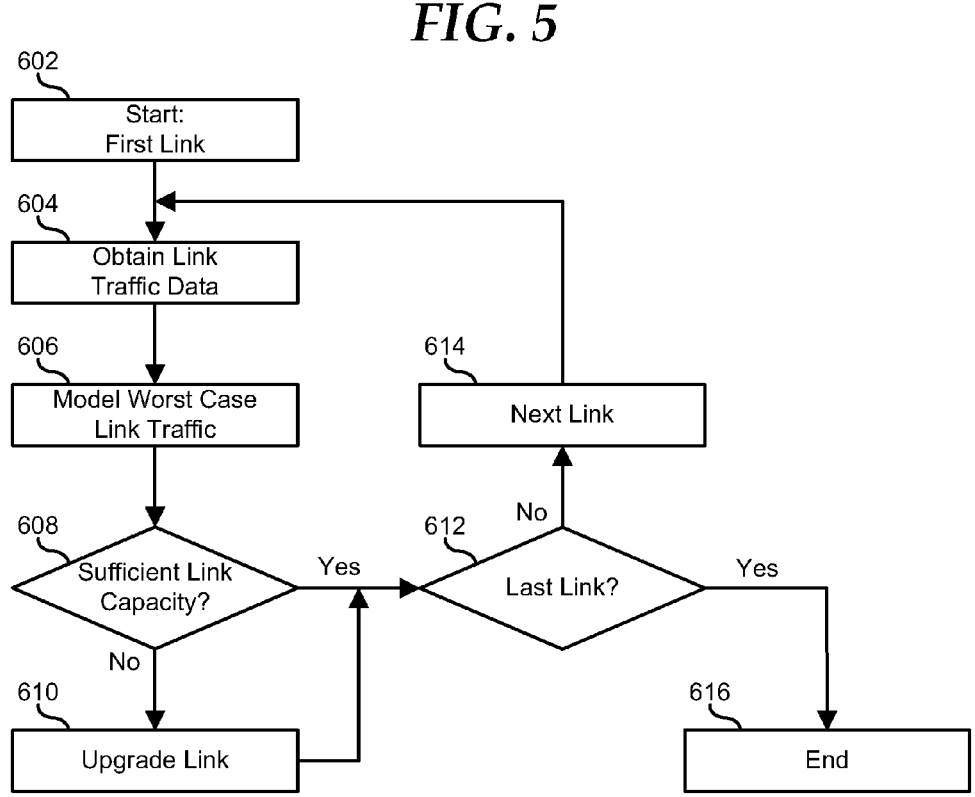
FIG. 6 is a flow diagram illustrating a method of planning link capacities in a network.

FIG. 6 is a flow chart illustrating a method of planning link capacities in a network. The method starts with the collection of load data for each link and traffic flow data for each router pair in the network in block 602. The link traffic data can be based upon real time or historical traffic flow information gathered from the network equipment through a network management mechanism. A first link in the network is selected in block 604. For example, analysis may start with link 121 in FIG. 1. Link traffic data is obtained for the link in block 604. Based upon the link load and traffic data, the link is modeled and a worst-case traffic flow is determined in block 606. A method of modeling worst-case traffic flow is described below. A decision is made as to whether or not the actual link capacity is sufficient to carry the modeled worst-case traffic flow in decision block 608. If not, the "NO" branch of decision block 608 is taken, and the link is upgraded in block 610. For example, the modeled worst-case traffic flow in link 121 can be determined to be 150 Gb/s, but the actual link capacity of link 121 may be 125 Gb/s, and so link 121 is upgraded with equipment adequate to handle at least 150 Gb/s of link traffic.

If the link capacity is upgraded in block 610, or if the actual link capacity is sufficient to carry the modeled worst-case traffic flow as determined in decision block 608 and the "YES" branch is taken, then a decision is made as to whether or not the last link of the network has been evaluated in decision block 612. If not, the "NO" branch of decision block 612 is taken, then the next link is considered in block 614, and processing returns to block 606, where the next link is modeled and a worst-case traffic flow is determined. For example, link 122 can be evaluated after link 121 is evaluated. If the last link of the network has been evaluated, then the "YES" branch of decision block 612 is taken, and processing ends in block 616.

Figure 7:
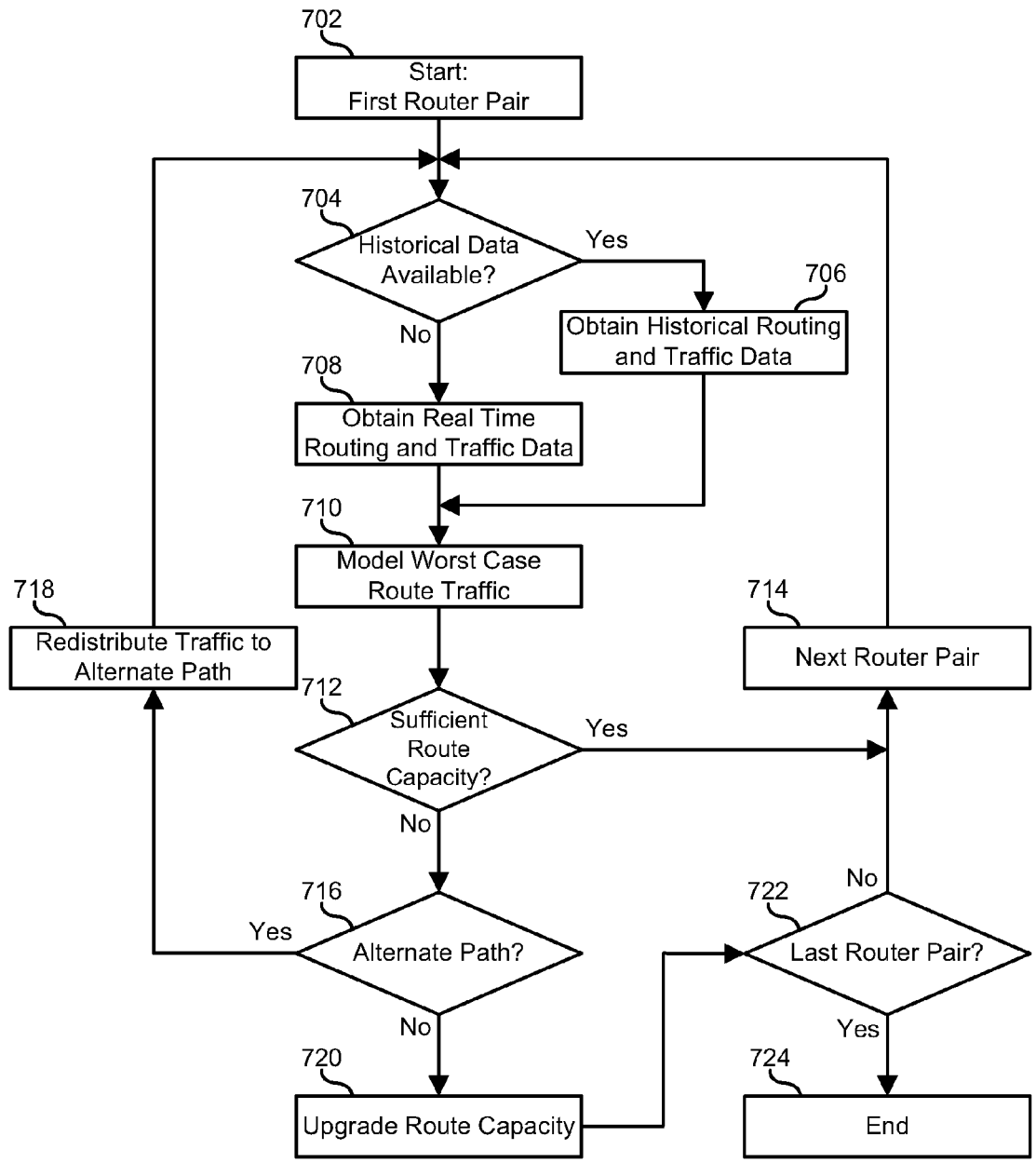
FIG. 7 is a flow diagram illustrating a method of planning router pair capacities in a network.

FIG. 7 is a flow chart illustrating a method of planning router pair capacities in a network. The method starts with a first router pair in the network in block 702. For example, analysis may start with evaluating traffic between nodes 111 and 116. A decision is made as to whether or not historical traffic flow between the node pair is available in decision block 704. If so, the "YES" branch of decision block 704 is taken, and the historical routing and traffic data is obtained for the router pair in block 706. If historical traffic flow between the nodes is not available, the "NO" branch of decision block 704 is taken, and the real time routing and traffic data is obtained for the router pair in block 708. After the historical routing and traffic data is obtained in block 706, or the real time routing and traffic data is obtained in block 708, the link is modeled and a worst-case traffic flow is determined in block 710. A decision is made as to whether or not the actual router pair capacity is sufficient to carry the modeled worst-case traffic flow in decision block 712. If so, the "YES" branch of decision block 712 is taken, and the next router pair is considered in block 714, and processing returns to decision block 704, where a decision is made as to whether or not historical traffic flow between the node pair is available.

If the actual router pair capacity is not sufficient to carry the modeled worst-case traffic flow, the "NO" branch of decision block 712 is taken, and a decision is made as to whether or not there is an alternate path that is underutilized, and that a portion of the worst case traffic can be redistributed to the alternate path in decision block 716. If so, the "YES" branch of decision block 716 is taken, and the portion of the worst case traffic is diverted to the alternate path in block 718, and processing returns to decision block 704, where a decision is made as to whether or not historical traffic flow data is available between the node pair with a portion of the traffic redistributed to the alternate path. If there is no alternate path that is underutilized, the "NO" branch of decision block 716 is taken, and the route capacity between the router pair is upgraded in block 720. For example, the modeled worst-case traffic flow between nodes 111 and 116 can be determined to be 500 Gb/s, but the actual link capacities between nodes 111 and 116 may be 400 Gb/s, as, for example if links 125 and 127 each have a maximum capacity of 200 Gb/s, then the link capacities between nodes 111 and 116 are upgraded with equipment adequate to handle at least 500 Gb/s of route traffic. A decision is made as to whether or not the last node pair of the network has been evaluated in decision block 722. If not, the "NO" branch of decision block 722 is taken, and the next router pair is considered in block 714, and processing returns to block 704, where a decision is made as to whether or not historical traffic flow between the node pair is available. For example, nodes 112 and 116 can be evaluated after nodes 111 and 116 are evaluated. If the last router pair of the network has been evaluated, then the "YES" branch of decision block 722 is taken, and processing ends in block 724.

Figure 8:
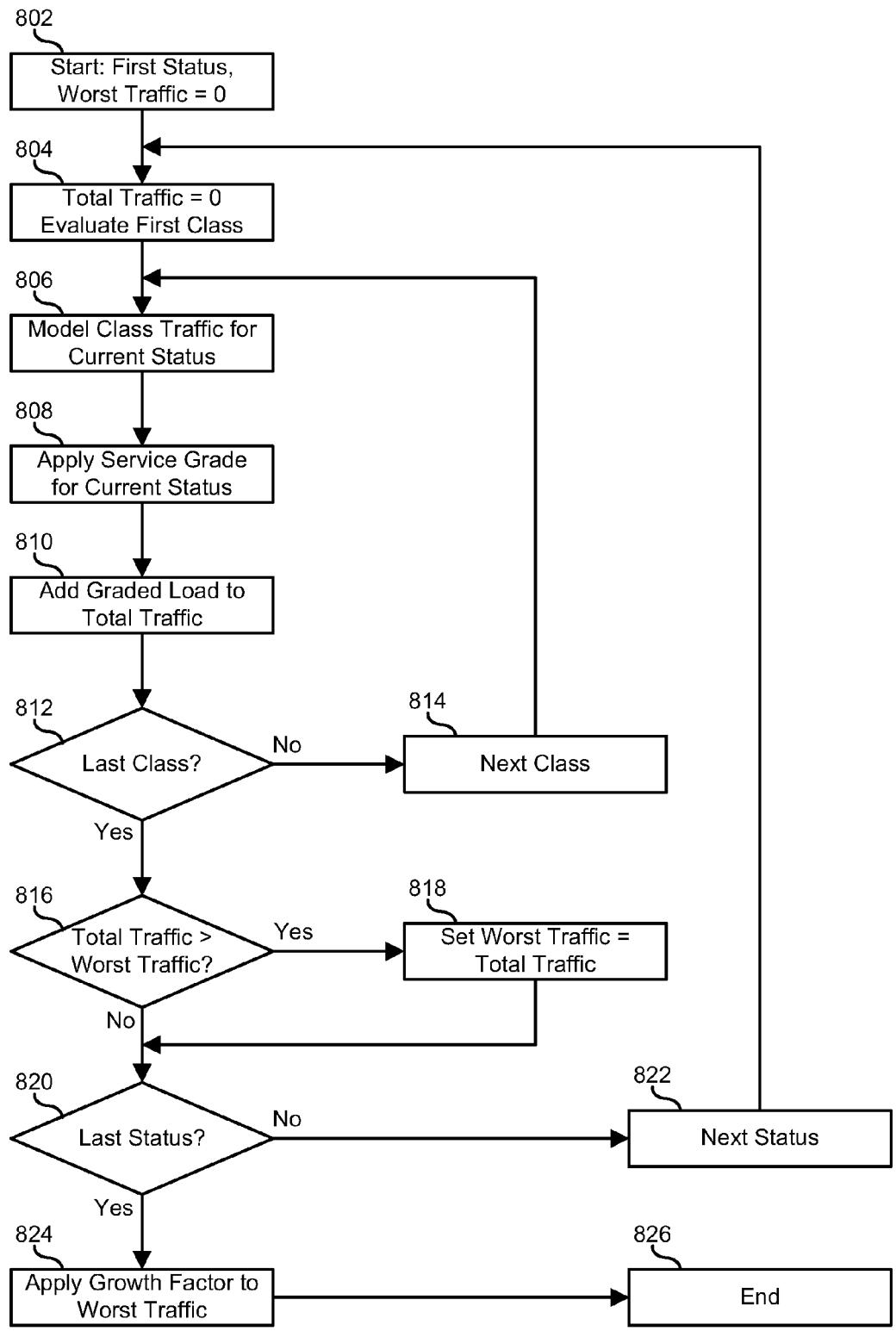
FIG. 8 is a flow diagram illustrating a method of modeling worst case traffic flows in a network.

FIG. 8 illustrates a method of modeling worst case traffic flows on a network. The method described can be applied to modeling of worst case traffic flows over a link, or between a router pair. The method starts by evaluating a first network status, and by setting a "Worst Case Traffic" variable equal to "0" in block 802. For example, a network operator can choose to model links or router pairs under different operating conditions including normal operation and one or more failure scenarios, and can begin modeling worst case traffic flows by evaluating normal operation first. A "Total Traffic" variable is set to equal "0," and a first data traffic class is chosen for evaluation in block 804. For example, a network operator can choose to categorize data traffic in one or more classes such as "High," "Medium," or "Low" and can begin modeling worst case traffic flows by evaluating the "High" class first. The link or route pair traffic flow is modeled for the selected network condition and the selected class in block 806. Economic and performance based criteria may be used to route particular router-pair traffic for a class. An exemplary criterion may be to minimize total network cost subject to satisfying grade of service and/or other constraints such as round trip delay for each class. The service grade for the selected network condition and the selected class is applied to the modeled traffic flow to determine the traffic flow of the selected class in the selected network condition in block 808. For example, the network provider can decide to grade service as shown in table 1, above.

The modeled traffic flow is added to the "Total Traffic" variable in block 810. A decision is made as to whether or not the chosen class is the last class in decision block 812. If not, the "NO" branch of decision block 812 is taken, the next class is selected in block 814, and processing returns to block 806, where the link or route pair traffic flow is modeled for the selected network condition and the next class. If the chosen class is the last class, the "YES" branch of decision block 812 is taken, and a decision is made as to whether or not the "Total Traffic" variable is greater than the "Worst Traffic" variable. If so, the "YES" branch of decision block 816 is taken, and the "Worst Traffic" variable is set to equal the "Total Traffic" variable in block 818. After the "Worst Traffic" variable is set to equal the "Total Traffic" variable in block 818, or if the "Total Traffic" variable is not greater than the "Worst Traffic" variable and the "NO" branch of decision block 816 is taken, a decision is made as to whether or not the chosen network status is the last network status in decision block 820. If not, the "NO" branch of decision block 820 is taken, the next network status is selected in block 822, and processing returns to block 804, where a first data traffic class is chosen for evaluation. If the chosen network status is the last network status, the "YES" branch of decision block 820 is taken, and a network growth factor is applied to the "Worst Traffic" variable in block 824, and processing ends in block 826.

Figure 9:
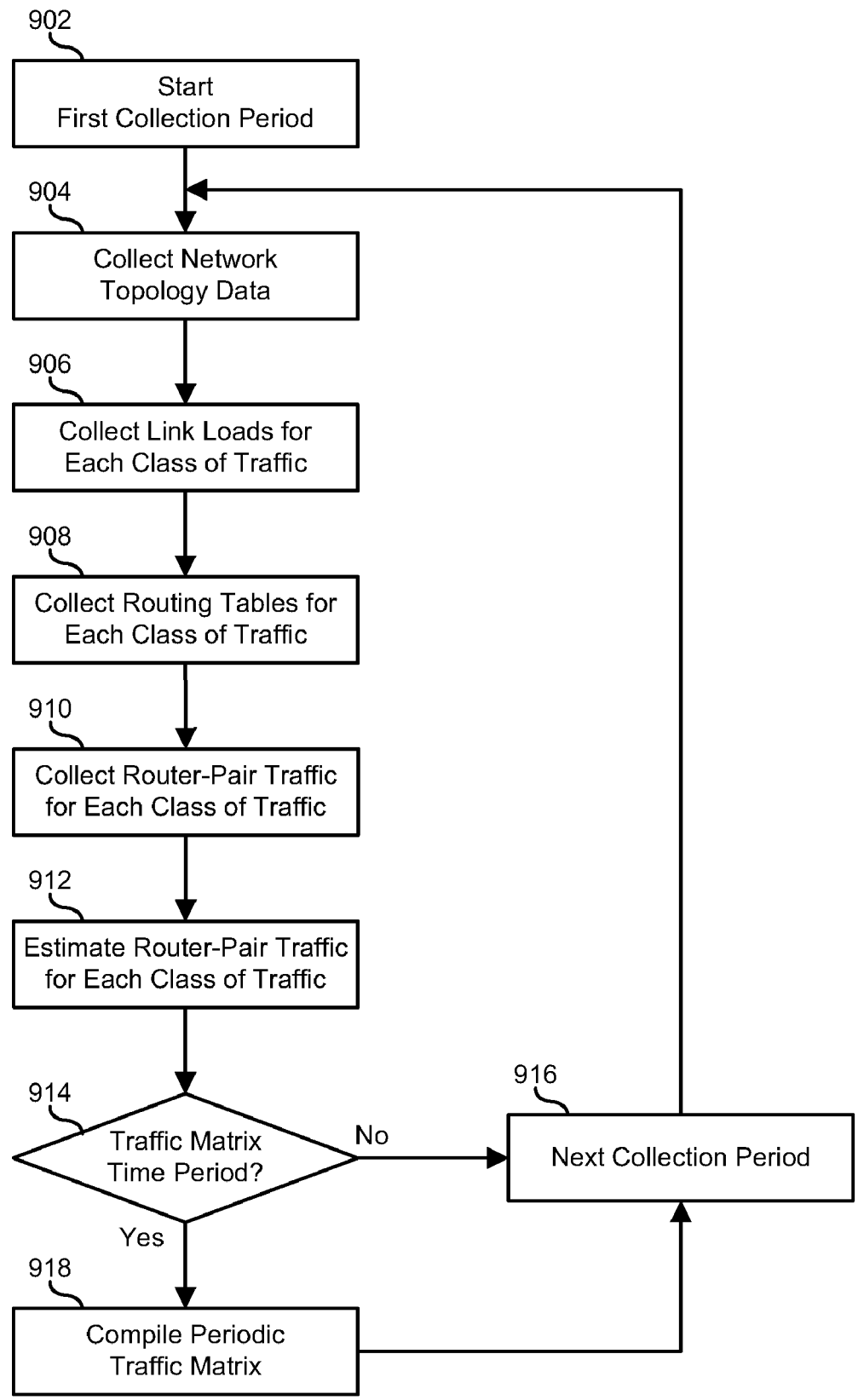
FIG. 9 is a flow diagram illustrating a method of capturing network traffic information to form a traffic matrix.

FIG. 9 illustrates a method of capturing network traffic information to form a traffic matrix. The method starts with a first data collection period in block 902. A data collection period is a time interval in which data is to be collected from a network. For example, a data collection period can be a minute or number of minutes, an hour or number of hours, or another time interval. Network topology data is collected for the collection period in block 904. The network topology data can be data collected from the network routers using an Internet Gateway Protocol (IGP) data exchange, a Border Gateway Protocol (BGP) data exchange, or another data exchange that includes network topology data. Load data is collected for each link, and each class of network data traffic for the collection period in block 906. Load data can be collected from the network routers by an exchange of Simple Network Management Protocol (SNMP) data, or another network data collection mechanism. Routing tables from each network router for each class of network data traffic is collected for the collection period in block 908. Routing tables can be collected from the network routers using BGP or another data exchange that includes routing tables. Sampled router pair traffic flow data is collected in block 910. Router pair traffic flow data can be collected by NetFlow, or another traffic flow data collection and processing mechanism. Non-historical information such as marketing forecast of new customer demand may also be used to supplement historical traffic flow information. Traffic loads for each router pair are estimated for each class of network data traffic for the collection period in block 912. The traffic load estimates may utilize the data collected above in blocks 904-910 for the data collection period current data collection period.

A decision is made as to whether or not a periodic traffic matrix time period has passed in decision block 914. A periodic traffic matrix time period is a time interval that includes a number of collection periods. For example, a periodic traffic matrix time period can be an hour or number of hours, a day, or another time interval that includes a number of collection periods. If the periodic traffic matrix time period has not passed, the "NO" branch of decision block 914 is taken, the next collection period is started in block 916, and processing continues in block 904, where the network topology data is collected for the next collection period. If the periodic traffic matrix time period has passed, the "YES" branch of decision block 914 is taken, and a periodic traffic matrix is compiled in block 918. The periodic traffic matrix is compiled from the traffic load estimates from block 912 above. For example, a periodic traffic matrix can be complied daily, weekly, monthly, or another time interval. The next collection period is started in block 916, and processing continues in block 904, where the network topology data is collected for the next collection period.

Figure 10:
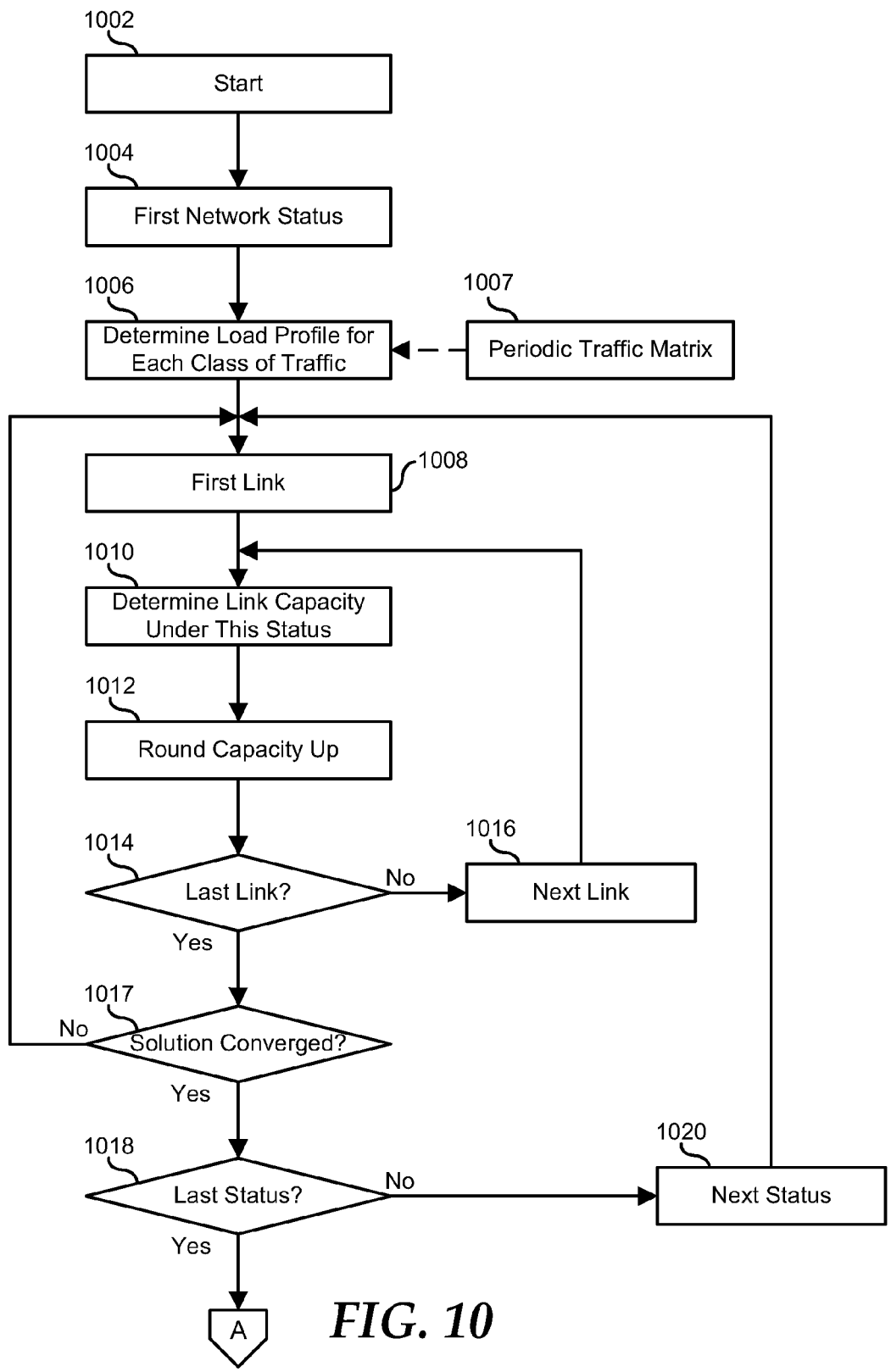
FIGS. 10 and 11 are a flow diagram illustrating a method of capacity management in a network.
Figure 11:
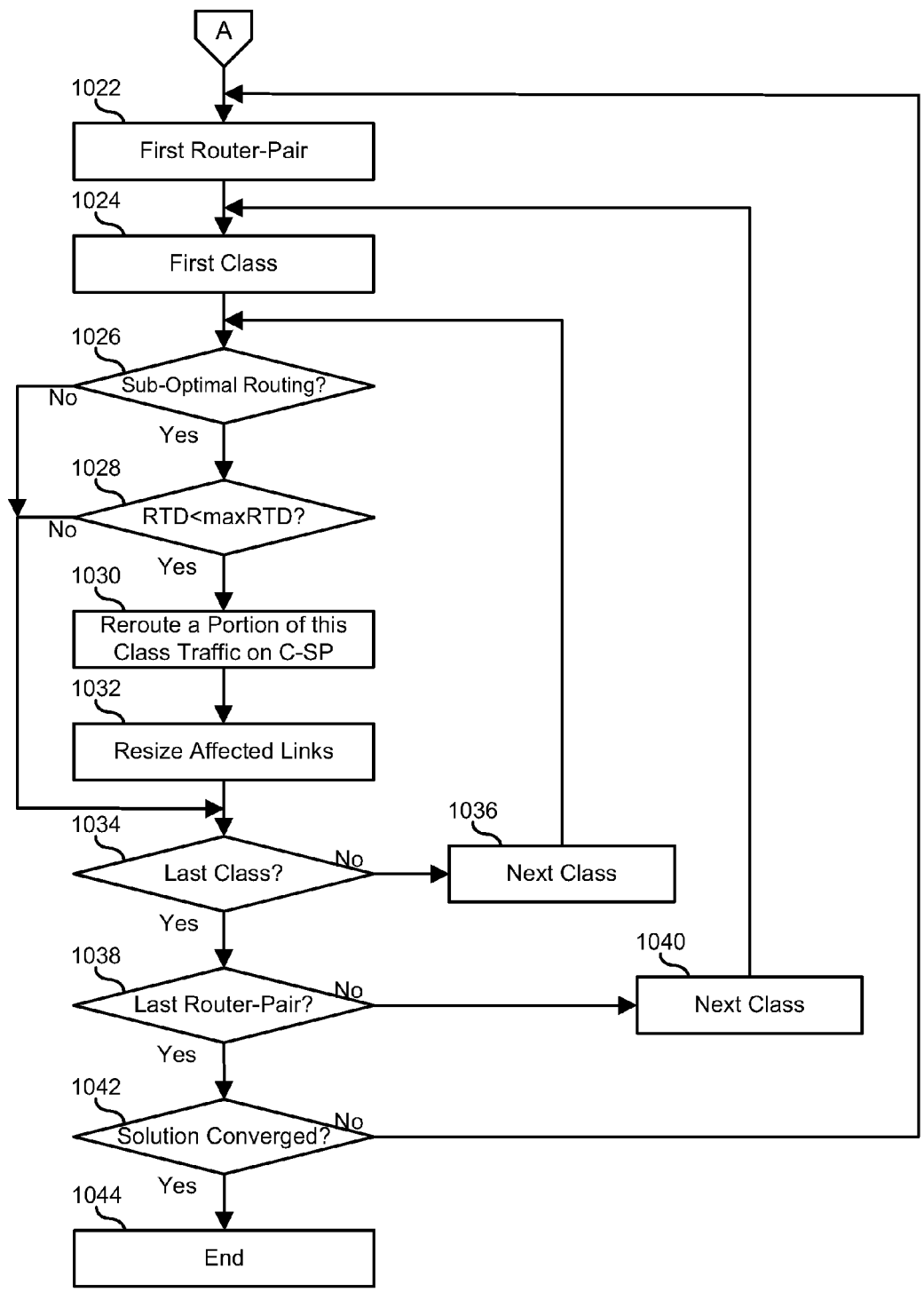

FIGS. 10 and 11 illustrate a method of capacity management in a network. The method starts in block 1002, and a first network status is considered in block 1004. For example, a network operator can choose to the network under different operating conditions including a normal operation status, a single-link failure status for each link in the network, a double-link failure state for each pair of links, a single- or double-node failure status for each node or pair of nodes, another network status, or any combination thereof. A load profile for each class of traffic is determined for the first network status in block 1006. The load profile is a modeled profile of the behavior of the network under the first network status. As such, a periodic traffic matrix 1007 can provide a data input for the modeling of the load profile. The periodic traffic matrix can be similar to the periodic traffic matrix described in FIG. 9, above. A first link in the network is considered in block 1008. A link capacity for the first link is determined based upon the load profile for the first network status in block 1010. The link capacity may be determined using class of service queuing models with the load profile and grade of service as inputs. The initial load profile for each link can be derived from the traffic matrix and grade of service for each class. For example, the load profile may indicate that, under the first network status, the first link will see 1 Gb/s of Class 1 data traffic, 10 Gb/s of Class 2 data traffic, and 100 Gb/s of Class 3 data traffic, and that thus the first link should have a data traffic capacity of at least 111 Gb/s. The link capacity is rounded up to a next economical modular link size in block 1012. For example, if, as in the above example, the first link should have a data traffic capacity of at least 111 Gb/s, and 20 Gb/s routers are preferred, then the first link capacity should be rounded up to 120 Gb/s.

A decision is made as to whether or not the last link in the network has been evaluated under the present status in decision block 1014. If not, the "NO" branch of decision block 1014 is taken, the next link is selected in block 1016, and processing continues in block 1010 where a link capacity for the next link is determined based upon the load profile for the first network status. If the last link in the network has been evaluated under the present status, the "YES branch of decision block 1014 is taken, and a decision is made as to whether or not the link capacity solution is converged in decision block 1017. A link capacity solution can be said to be converged if the given link capacities satisfy a desired grade of service for each class for each link in the network for the given load profile. If the link capacity solution is not converged, the "NO" branch of decision node 1017 is taken, and processing continues in block 1008 where A first link in the network is considered. If the link capacity solution is converged, the "YES" branch of decision node 1017 is taken, and a decision is made as to whether or not the last network status has been evaluated in decision block 1018. If not, the "NO" branch of decision block 1018 is taken, the next status is selected in block 1020, and processing continues in block 1008 where a first link in the network is considered.

If the last network status has been evaluated, the "YES" branch of decision block 1018 is taken a first pair of routers is selected in block 1022. A first class of data traffic is selected in block 1024, and a decision is made as to whether or not the class of data traffic is eligible for sub-optimal routing in decision block 1026. For example, using Table 2 above, Class 1 data traffic is not eligible to be degraded, while Classes 2 and 3 may be degraded to 80% and 50%, respectively. If the class of data traffic is eligible for sub-optimal routing, the "YES" branch of decision block 1026 is taken, and a decision is made as to whether or not the round trip delay (RTD) for the selected router-pair is less than a predetermined maximum RTD in decision block 1028. If so, a portion of the selected class traffic is rerouted according to a constrained shortest path (C-SP) model in block 1030. Economic and performance based criteria may be used to route particular router-pair traffic for a class. An exemplary criterion may be to minimize total network cost subject to satisfying grade of service for each class. The links that are affected by the rerouting are resized in block 1032. For example, a particular link capacity can be determined, and the link capacity can be rounded up to a next economical modular link size.

If either the links that are affected by the rerouting are resized in block 1032, the class of data traffic is not eligible for sub-optimal routing and the "NO" branch of decision block 1026 is taken, or the RTD for the selected router-pair is not less than the predetermined maximum RTD and the "NO" branch of decision block 1028 is taken, then a decision is made as to whether or not the last class of data traffic has been evaluated in decision block 1034. If not, the "NO" branch of decision block 1034 is taken, the next class of data traffic is selected in block 1036, and processing continues at decision block 1026 where a decision is made as to whether or not the next class of data traffic is eligible for sub-optimal routing.

If the last class of data traffic has been evaluated, the "YES" branch of decision block 1034 is taken, and a decision is made as to whether or not the last router pair has been evaluated in decision block 1038. If not, the "NO" branch of decision block 1038 is taken, the next router pair is selected in block 1040, and processing continues at block 1024 where a first class of data traffic is selected. If the last router pair has been evaluated, the "YES" branch of decision block 1038 is taken, and a decision is made as to whether or not the solution to the modeling process has converged to a stable state in decision block 1042. The modeling process solution can be said to be converged based upon an economic criteria. For example, the modeling process solution can be said to be converged when further iterations of the traffic rerouting results in no further reductions in network cost. If the solution to the modeling process has not converged to a stable state, then the "NO" branch of decision block 1042 is taken, and processing continues at block 1022 where a first pair of routers is selected. If the solution to the modeling process has converged to a stable state, the "YES" branch of decision block 1042 is taken and processing ends in block 1044.

Figure 12:
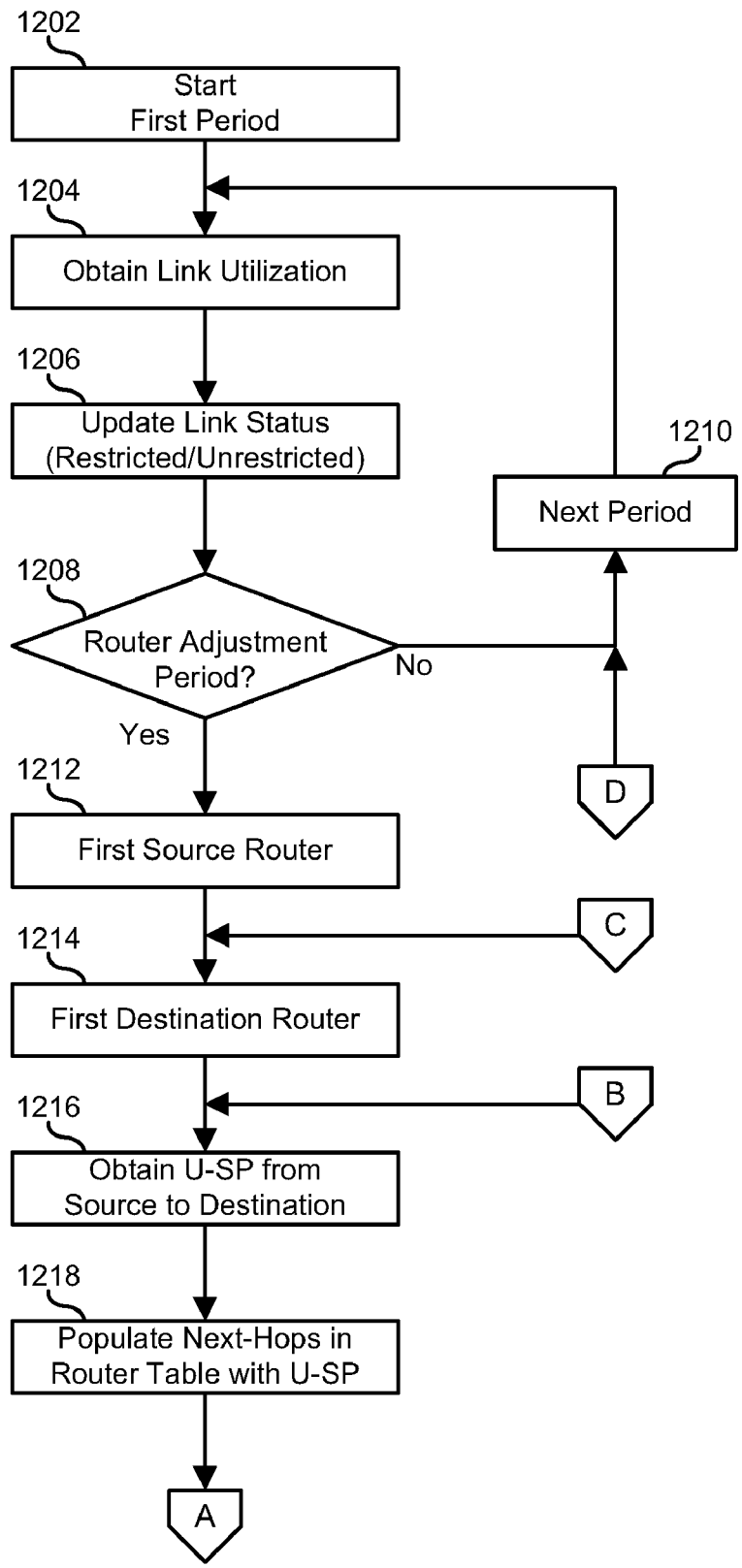
FIGS. 12 and 13 are a flow diagram illustrating a method of managing traffic in a network.
Figure 13:
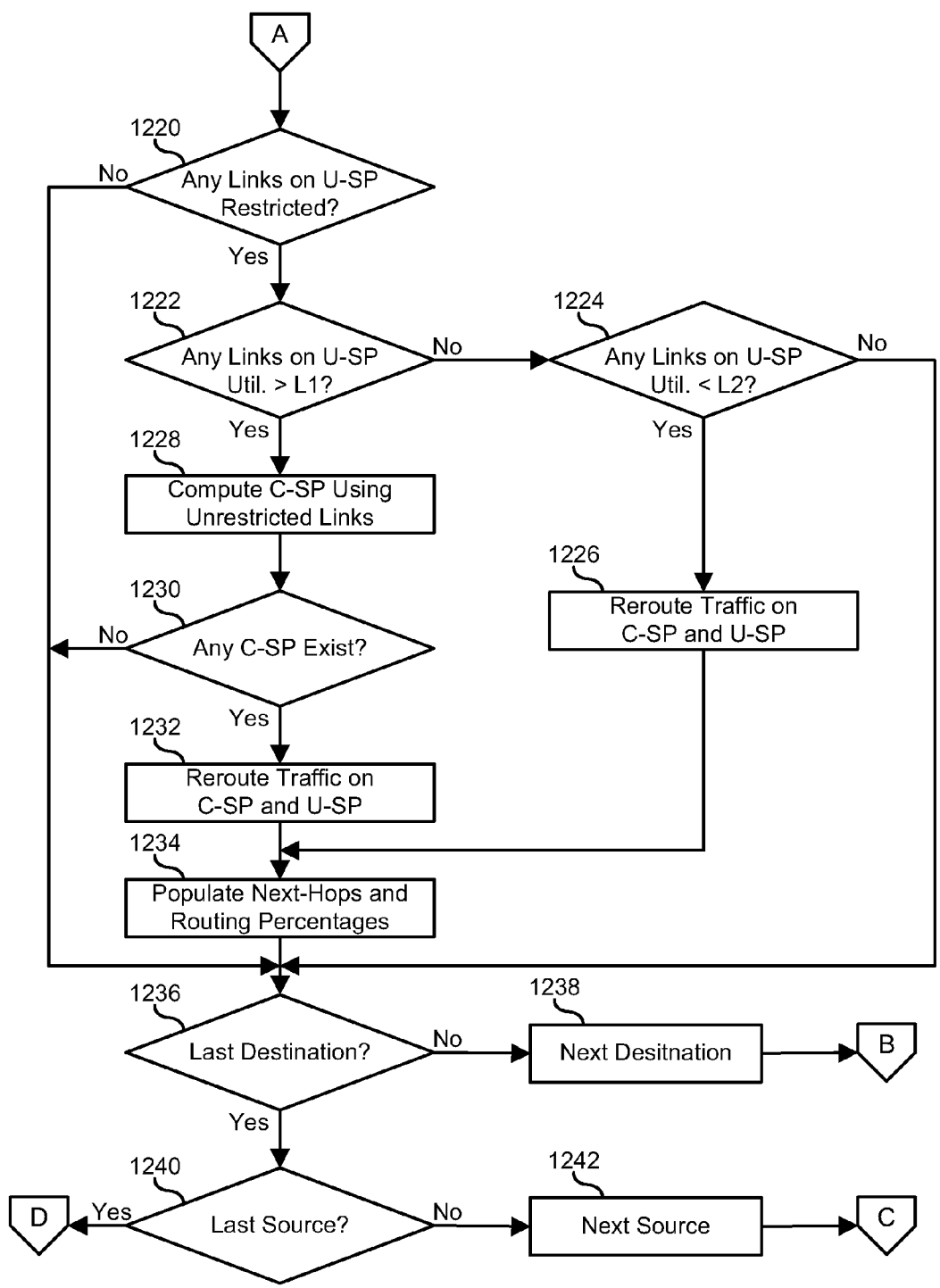

A network operator may desire to alter the network management process to take advantage of the link capacities as described above. FIGS. 12 and 13 illustrate a method of managing traffic in a network. The method starts with a first data collection period in block 1202. A data collection period is a time interval in which network data is collected. For example, a data collection period can be a minute or number of minutes, an hour or number of hours, or another time interval. A link utilization is obtained for each link in the network in block 1204. A link utilization can be a measurement of the data traffic flow rate for each class in the first data collection period. A link utilization status can be updated in block 1206. For example, utilization thresholds can be established for each class of traffic, such as "L1" and "L2," where L2<L1. As such, if the link utilization for a given class of traffic is greater than L1, then the link's utilization status can be set to "Restricted" for any lower traffic classes. If the link utilization for a given class of traffic is less than L2 and its utilization to lower traffic classsis is not restricted, then the link's utilization status can be set to "Unrestricted." If the link utilization for a given class of traffic is greater than L2, but less than L1, then the link's utilization status can remain unchanged. A decision is made as to whether or not a router adjustment period has passed in decision block 1208. A router adjustment period is a time interval that includes a number of data collection periods. For example, a router adjustment period can be an hour or number of hours, a day, or another time interval that includes a number of data collection periods. If the router adjustment period has not passed, the "NO" branch of decision block 1208 is taken, the next data collection period is started in block 1210, and processing continues in block 1204, where a link utilization is obtained for each link in the network.

If the router adjustment period has passed, the "YES" branch of decision block 1208 is taken, and a first source router is selected in block 1212. A first destination router is selected in block 1214. A route is selected between the first source router and the first destination router using an unconstrained shortest path (U-SP) model in block 1216. The U-SP model can be similar to an Open Shortest Path First routing decision model that is aware of the different classes of data traffic and uses all available links in determining the shortest path. The routers along the selected route are populated with the appropriate U-SP next-hops in block 1218. A decision is made as to whether or not any of the links on the U-SP route are restricted in decision block 1220. If so, the "YES" branch of decision block 1220 is taken, and a decision is made as to whether or not any of the links on the U-SP route have a link utilization that is greater than L1 in decision block 1222. If so, then the "YES" branch of decision block 1222 is taken, and a route is selected between the first source router and the first destination router using a constrained shortest path (C-SP) model in block 1228. The C-SP model can be similar to the U-SP model that uses only unrestricted links in determining the shortest path. Economic and performance based criteria may be used to route particular router-pair traffic for a class. An exemplary criterion may be to minimize total network cost subject to satisfying grade of service for each class. A decision is made as to whether or not any C-SP routes are available in decision block 1230. If so, the "YES" branch of decision block 1230 is taken and traffic is rerouted on the C-SP and the U-SP routes in block 1232. For example, the lower class traffic on the C-SP route can be increased by a given amount, and the lower class traffic on the U-SP route can be decreased by a corresponding amount.

If none of the links on the U-SP route have a link utilization that is greater than L1, the "NO" branch of decision block 1222 is taken and a decision is made as to whether or not any of the links on the U-SP route have a link utilization that is less than L2 in decision block 1224. If so, the "YES" branch of decision block 1224 is taken, and traffic is rerouted on the C-SP and the U-SP routes in block 1226. For example, the lower class traffic on the C-SP route can be decreased by a given amount, and the lower class traffic on the U-SP route can be increased by a corresponding amount. If traffic is rerouted on the C-SP and the U-SP routes in either of blocks 1226 or 1232, then the routers along the selected routes are populated with the appropriate C-SP and U-SP next-hops in block 1234.

If either, none of the links on the U-SP route are restricted and the "NO" branch of decision block 1220 is taken, none of the links on the U-SP route have a link utilization that is less than L2 and the "NO" branch of decision block 1224 is taken, no C-SP routes are available and the "NO" branch of decision block 1230 is taken, or the routers along the selected routes are populated with the appropriate C-SP and U-SP next-hops in block 1234, then a decision is made as to whether or not the present destination router is the last destination router in decision block 1236. If not, the "NO" branch of decision block 1236 is taken, the next destination router is selected in block 1238, and processing continues in block 1216 where a route is selected between the first source router and the next destination router. If the present destination router is the last destination router, the "YES" branch of decision block 1236 is taken and a decision is made as to whether or not the present source router is the last source router in decision block 1240. If not, the "NO" branch of decision block 1240 is taken, the next source router is selected in block 1242, and processing continues in block 1214 where a first destination router is selected. If the present source router is the last source router, the "YES" branch of decision block 1240 is taken and the next data collection period is started in block 1210.

Figure 14:
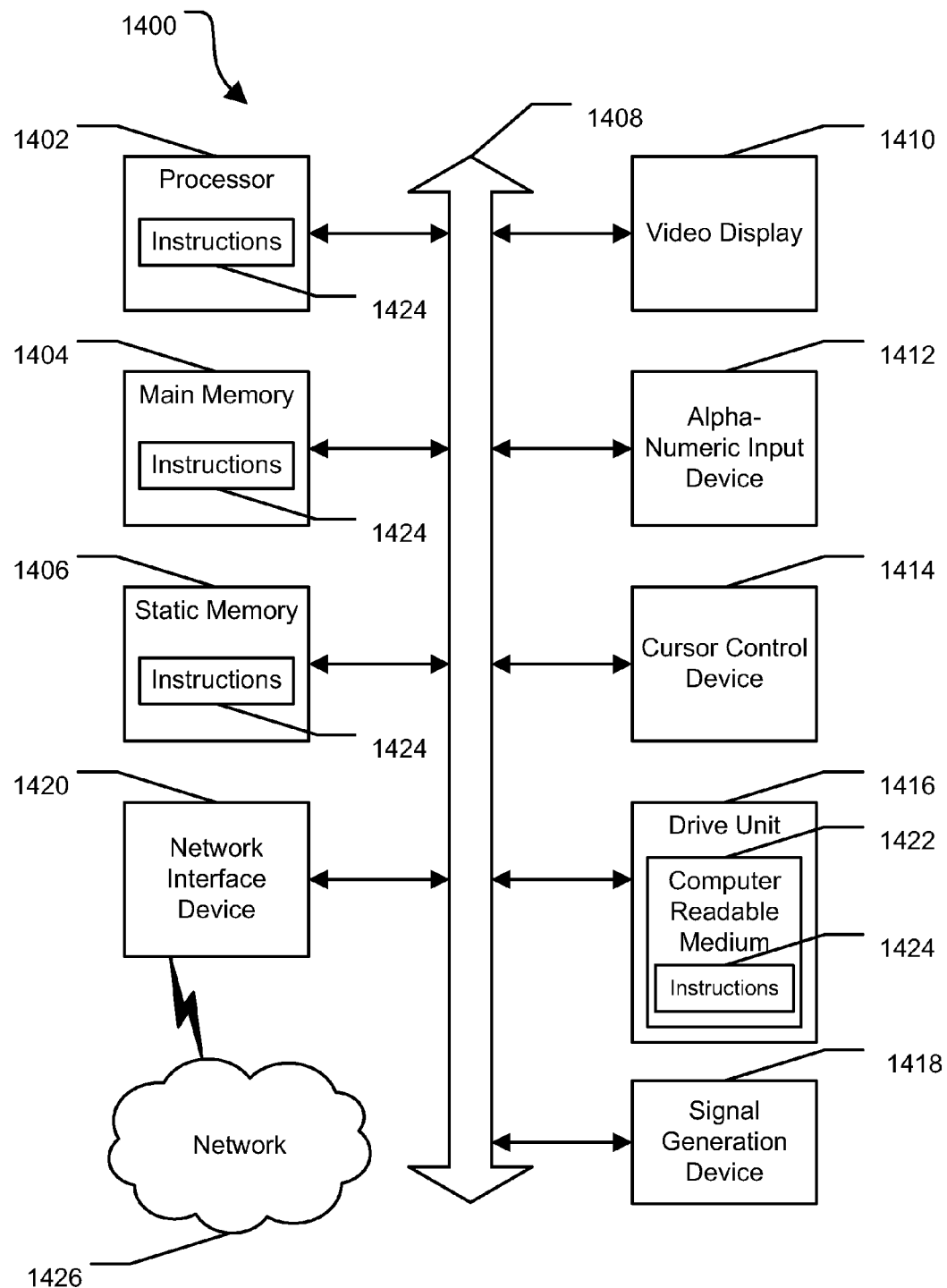
FIG. 14 is an illustrative embodiment of a general computer system.

FIG. 14 shows an illustrative embodiment of a general computer system 1400. The computer system 1400 can include a set of instructions that can be executed to cause the computer system to perform any one or more of the methods or computer based functions disclosed herein. The computer system 1400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1400 can be implemented using electronic devices that provide voice, video or data communication. Further, while a single computer system 1400 is illustrated, the term "system" shall also be taken to include any collection of systems or sub-systems that individually or jointly execute a set, or multiple sets, of instructions to perform one or more computer functions.

The computer system 1400 may include a processor 1402, such as a central processing unit (CPU), a graphics processing unit (GPU), or both. Moreover, the computer system 1400 can include a main memory 1404 and a static memory 1406 that can communicate with each other via a bus 1408. As shown, the computer system 1400 may further include a video display unit 1410 such as a liquid crystal display (LCD), an organic light emitting diode (OLED), a flat panel display, a solid-state display, or a cathode ray tube (CRT). Additionally, the computer system 1400 may include an input device 1412 such as a keyboard, and a cursor control device 1414 such as a mouse. Alternatively, input device 1412 and cursor control device 1414 can be combined in a touchpad or touch sensitive screen. The computer system 1400 can also include a disk drive unit 1416, a signal generation device 1418 such as a speaker or remote control, and a network interface device 1420 to communicate with a network 1426. In a particular embodiment, the disk drive unit 1416 may include a computer-readable medium 1422 in which one or more sets of instructions 1424, such as software, can be embedded. Further, the instructions 1424 may embody one or more of the methods or logic as described herein. In a particular embodiment, the instructions 1424 may reside completely, or at least partially, within the main memory 1404, the static memory 1406, and/or within the processor 1402 during execution by the computer system 1400. The main memory 1404 and the processor 1402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of capacity planning in a network, the method comprising:
    assigning to each packet of data on the network a class of service from among a plurality of classes of service;
    assigning to each of the plurality of classes of service a grade of service for each of a plurality of network conditions;
    calculating a class bandwidth for each of the plurality of classes of service under each of the plurality of network conditions by multiplying an expected load for each of the plurality of classes of service under each of the plurality of network conditions by the associated grade of service for each of the plurality of classes of service under each of the plurality of network conditions;

calculating a first network condition bandwidth for each of the plurality of network conditions by adding together the class bandwidths for each of the plurality of classes of service under each of the plurality of network conditions;

determining a first network demand by determining the largest first network condition bandwidth, wherein determining the first network demand further comprises multiplying the largest network condition bandwidth by a growth factor;

predicting a first network capacity based upon the first network demand, wherein predicting the first network capacity is performed for each of a plurality of links in the network;

in response to predicting the first network capacity for each of the plurality of links, determining for a particular link of the plurality of links if the first predicted network capacity of the particular link is greater than the actual capacity of the particular link;

in response to determining that the first predicted network capacity of the particular link is greater than the actual capacity of the particular link, upgrading the particular link such that the actual capacity of the particular link is greater than the first predicted network capacity of the particular link;

before upgrading the particular link, calculating a second network condition bandwidth under each of the plurality of network conditions by:
  adding together the class bandwidths for a subset of the plurality of classes of service for the particular link under each of the plurality of network conditions; and
  adding together the class bandwidths for each of the plurality of the classes of service for the remainder of the plurality of links under each of the plurality of network conditions, and the class bandwidths for the remainder of the plurality of classes of service for the particular link under each of the plurality of network conditions;

determining a second network demand by determining the largest second network condition bandwidth;

predicting a second network capacity based upon the second network demand;

in response to predicting the second network capacity for each of the plurality of links, determining for the particular link of the plurality of links if the second predicted network capacity of the particular link is greater than the actual capacity of the particular link; and in response to determining that the second predicted network capacity of the particular link is greater than the actual capacity of the particular link, upgrading the articular link such that the actual capacity of the particular link is greater than the second predicted network capacity of the particular link.

2. The method of claim 1, wherein the expected load for each class of service under each of the plurality of network conditions is determined by evaluating historical data for each class of service.

3. The method of claim 1, wherein the expected load for each class of service under each of the plurality of network conditions is determined by evaluating real time network data for each class of service.

4. The method of claim 1, wherein the plurality of network conditions includes operating the network with a failure condition.

5. The method of claim 4, wherein the failure condition includes a link failure.

6. The method of claim 4, wherein the failure condition includes a router failure.

7. A network management apparatus comprising a processor operative to:
  assign to each packet of data on a network a class of service from among a plurality of classes of service;
  assign to each of the plurality of classes of service a grade of service for each of a plurality of network conditions, wherein the grade of service is a number between zero and one, inclusive;
  calculate a class bandwidth for each of the plurality of classes of service under each of the plurality of network conditions by multiplying an expected load for each of the plurality of the classes of service under each of the plurality of network conditions by the associated grade of service for each of the plurality of the classes of service under each of the plurality of network conditions;
  calculate a network condition bandwidth for each of the plurality of network conditions by adding together the class bandwidths for each of the plurality of the classes of service under one of the plurality of network conditions;
  determine a first network demand by determining the largest network condition bandwidth;
  predict a first network capacity for each of a plurality of links in the network based upon the first network demand;
  determine for a particular link of the plurality of links if the first predicted network capacity of the particular link is greater than the actual capacity of the particular link;
  calculate a second network condition bandwidth under each of the plurality of network conditions, wherein, in calculating, the processor is further operable to:
    add together the class bandwidths for a subset of the plurality of classes of service for the particular link under each of the plurality of network conditions; and
    add together the class bandwidths for each of the plurality of the classes of service for the remainder of the plurality of links under each of the plurality of network conditions, and the class bandwidths for the remainder of the plurality of classes of service for the particular link under each of the plurality of network conditions;
  upgrade the particular link such that the actual capacity of the particular link is greater than the first predicted network capacity of the particular link in response to determining that the first predicted network capacity of the particular link is greater than the actual capacity of the particular link;
  determine a second network demand by determining the largest second network condition bandwidth;
  predict a second network capacity based upon the second network demand;
  determine for the particular link of the plurality of links if the second predicted network capacity of the particular link is greater than the actual capacity of the particular link in response to predicting the second network capacity for each of the plurality of links; and
  upgrade the particular link such that the actual capacity of the particular link is greater than the second predicted network capacity of the particular link in response to determining that the second predicted network capacity of the particular link is greater than the actual capacity of the particular link.

8. The network management apparatus of claim 7, wherein determining the first network demand further includes multiplying the largest network condition bandwidth by a growth factor.

9. The network management apparatus of claim 8, wherein predicting the network capacity is performed for each of a plurality of links in the network.

10. The network management apparatus of claim 9, wherein the processor is further operative to predict the network capacity based upon rerouting data packets of a particular class of service of the plurality of classes of service from a first particular link to a second particular link.

11. The network management apparatus of claim 7, wherein the plurality of network conditions includes operating the network with a failure condition.

12. A system comprising:
a network; and
a network management apparatus operative to:
  assign to each packet of data on the network a class of service;
  assign to each class of service a grade of service for each of a plurality of network conditions, wherein the grade of service is a number between zero and one, inclusive;
  calculate a class bandwidth for each class of service under each of the plurality of network conditions by multiplying an expected load for each class of service under each of the plurality of network conditions by the associated grade of service for each class of service under each of the plurality of network conditions;
  calculate a network condition bandwidth for each of the plurality of network conditions by adding together the class bandwidths for all classes of service under one of the plurality of network conditions;
  determine a first network demand by determining the largest network condition bandwidth;
  predict a network capacity for each of a plurality of links in the network based upon the first network demand;
  determine for a particular link of the plurality of links if the first predicted network capacity of the particular link is greater than the actual capacity of the particular link;
  calculate a second network condition bandwidth under each of the plurality of network conditions, wherein, in calculating, the processor is further operable to:
    add together the class bandwidths for a subset of the plurality of classes of service for the particular link under each of the plurality of network conditions; and
    add together the class bandwidths for each of the plurality of the classes of service for the remainder of the plurality of links under each of the plurality of network conditions, and the class bandwidths for the remainder of the plurality of classes of service for the particular link under each of the plurality of network conditions;
  upgrade the particular link such that the actual capacity of the particular link is greater than the first predicted network capacity of the particular link in response to determining that the first predicted network capacity of the particular link is greater than the actual capacity of the particular link;
  determine a second network demand by determining the largest second network condition bandwidth;
  predict a second network capacity based upon the second network demand;
  determine for the particular link of the plurality of links if the second predicted network capacity of the particular link is greater than the actual capacity of the particular link in response to predicting the second network capacity for each of the plurality of links; and
  upgrade the particular link such that the actual capacity of the particular link is greater than the second predicted network capacity of the particular link in response to determining that the second predicted network capacity of the particular link is greater than the actual capacity of the particular link.

13. The system of claim 12, wherein the network management apparatus is further operative to multiply the largest network condition bandwidth by a growth factor.

14. The system of claim 13, wherein the network management apparatus is further operative to predict the network capacity for each of a plurality of links in the network.

15. The system of claim 14, wherein:
the network management apparatus is further operative to determine for each particular link of the plurality of links if the predicted network capacity of the particular link is greater than the actual capacity of the particular link; and
the network is upgraded in response to determining that the predicted network capacity of the particular link is greater than the actual capacity of the particular link.

16. The system of claim 14, wherein the network management apparatus is operative to predict the network capacity based upon rerouting data packets of a particular class of service of the plurality of classes of service from a first particular link to a second particular link.

* * * * *